US010418855B2

(12) United States Patent
Shevde et al.

(10) Patent No.: US 10,418,855 B2
(45) Date of Patent: Sep. 17, 2019

(54) METHOD AND APPARATUS FOR VARYING A WIRELESS CHARGING CATEGORY OF A WIRELESS POWER RECEIVER IN WIRELESS CHARGING APPLICATIONS

(71) Applicant: QUALCOMM Incorporated, San Diego, CA (US)

(72) Inventors: Sumukh Ashok Shevde, Carlsbad, CA (US); Joseph Najib Maalouf, San Diego, CA (US); Curtis Gong, San Diego, CA (US); William Henry Von Novak, III, San Diego, CA (US); Mark White, II, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 15/081,088

(22) Filed: Mar. 25, 2016

(65) Prior Publication Data
US 2017/0047782 A1 Feb. 16, 2017

Related U.S. Application Data

(60) Provisional application No. 62/203,277, filed on Aug. 10, 2015.

(51) Int. Cl.
*H01F 27/42* (2006.01)
*H01F 37/00* (2006.01)
(Continued)

(52) U.S. Cl.
CPC .............. *H02J 50/12* (2016.02); *H02J 7/025* (2013.01); *H02J 50/80* (2016.02)

(58) Field of Classification Search
CPC . H02J 5/005; H02J 7/025; H02J 17/00; H01F 38/14; B60L 11/182
(Continued)

(56) References Cited

U.S. PATENT DOCUMENTS 9,796,284 B2 * 10/2017 Okamoto ............... B60L 11/182
2009/0271047 A1 * 10/2009 Wakamatsu ............ H02J 5/005
700/295
(Continued)

FOREIGN PATENT DOCUMENTS

WO WO-2006018231 A1 2/2006
WO WO-2014132258 A1 9/2014

OTHER PUBLICATIONS

International Search Report and Written Opinion—PCT/US2016/041922—ISA/EPO—dated Oct. 11, 2016.

*Primary Examiner* — Anh Q Tra
(74) *Attorney, Agent, or Firm* — Colby Nipper

(57) ABSTRACT

An apparatus for receiving wireless power is provided. The apparatus a communication circuit configured to transmit a first indication of a first wireless charging category associated with the apparatus. The communication circuit is further configured to receive an indication of a wireless charging class of a power transmit unit (PTU). The communication circuit is further configured to transmit a second indication of a second wireless charging category associated with the apparatus based on the wireless charging class of the PTU being compatible with a higher wireless charging category than the first wireless charging category. The apparatus further comprises a coupler configured to receive a level of wireless power corresponding to the second wireless charging category. The higher wireless charging category indicates an ability to receive a greater amount of wireless power than the first wireless charging category.

28 Claims, 6 Drawing Sheets

(51) Int. Cl.
*H01F 38/00* (2006.01)
*H02J 50/12* (2016.01)
*H02J 50/80* (2016.01)
*H02J 7/02* (2016.01)

(58) Field of Classification Search
USPC ......................................................... 307/104
See application file for complete search history.

(56) References Cited

U.S. PATENT DOCUMENTS

| | | | | |
|---|---|---|---|---|
| 2011/0270462 | A1* | 11/2011 | Amano | H02J 5/005 700/297 |
| 2012/0149307 | A1* | 6/2012 | Terada | H02J 7/025 455/66.1 |
| 2012/0299540 | A1 | 11/2012 | Perry | |
| 2013/0342024 | A1* | 12/2013 | Byun | H02J 5/005 307/104 |
| 2014/0009110 | A1 | 1/2014 | Lee et al. | |
| 2014/0015478 | A1 | 1/2014 | Von | |
| 2014/0125138 | A1* | 5/2014 | Chen | H02J 7/025 307/104 |
| 2014/0333128 | A1* | 11/2014 | Ichikawa | H02J 7/025 307/9.1 |
| 2015/0022013 | A1 | 1/2015 | Kim et al. | |
| 2015/0022018 | A1 | 1/2015 | Kim et al. | |
| 2015/0263548 | A1* | 9/2015 | Cooper | H02J 7/0027 320/108 |
| 2015/0270740 | A1* | 9/2015 | Lee | H04B 5/0037 320/108 |
| 2015/0340878 | A1* | 11/2015 | Oosumi | H02J 17/00 307/104 |
| 2016/0359467 | A1 | 12/2016 | Govindaraj et al. | |

* cited by examiner

METHOD AND APPARATUS FOR VARYING A WIRELESS CHARGING CATEGORY OF A WIRELESS POWER RECEIVER IN WIRELESS CHARGING APPLICATIONS

CROSS REFERENCE TO RELATED APPLICATIONS

This Application claims priority to Provisional Application No. 62/203,277 entitled "METHOD AND APPARATUS FOR VARYING A WIRELESS CHARGING CATEGORY OF A WIRELESS POWER RECEIVER IN WIRELESS CHARGING APPLICATIONS" filed Aug. 10, 2015. The disclosure of Provisional Application No. 62/203,277 is hereby expressly incorporated in its entirety by reference herein.

FIELD

This application is generally related to wireless power transfer, and more specifically to methods and apparatuses for varying a wireless charging category of a wireless power receiver in wireless charging applications.

BACKGROUND

In wireless charging a wireless power transmitter generates a time-varying magnetic field by driving an alternating current through a coil. The wireless power receiver may be configured to receive energy from the time-varying magnetic field in the form of a time-varying voltage induced in a coil of the wireless power receiver by the time-varying magnetic field. As wireless charging technologies continue to advance wireless power transmitters and wireless power receivers have begun to communicate with one another in order to set up, negotiate, and break down charging sessions to improve wireless charging times and efficiencies. Thus, methods and apparatuses for varying a wireless charging category of a wireless power receiver in wireless charging applications are desirable.

SUMMARY

According to some implementations, an apparatus for receiving wireless power is provided. The apparatus comprises a communication circuit configured to transmit a first indication of a first wireless charging category associated with the apparatus. The communication circuit is further configured to receive an indication of a wireless charging class of a power transmit unit (PTU). The communication circuit is further configured to transmit a second indication of a second wireless charging category associated with the apparatus based on the wireless charging class of the PTU being compatible with a higher wireless charging category than the first wireless charging category. The apparatus further comprises a coupler configured to receive a level of wireless power corresponding to the second wireless charging category.

In some other implementations, a method for receiving wireless power is provided. The method comprises transmitting a first indication of a first wireless charging category associated with the apparatus. The method comprises receiving an indication of a wireless charging class of a power transmit unit (PTU). The method comprises transmitting a second indication of a second wireless charging category associated with the apparatus based on the wireless charging class of the PTU being compatible with a higher wireless charging category than the first wireless charging category. The method comprises receiving a level of wireless power corresponding to the second wireless charging category.

In yet other implementations, a non-transitory, computer-readable medium comprising code is provided. The code, when executed, causes the apparatus to transmit a first indication of a first wireless charging category associated with the apparatus. The code, when executed, causes the apparatus to receive an indication of a wireless charging class of a power transmit unit (PTU). The code, when executed, causes the apparatus to transmit a second indication of a second wireless charging category associated with the apparatus based on the wireless charging class of the PTU being compatible with a higher wireless charging category than the first wireless charging category. The code, when executed, causes the apparatus to receive a level of wireless power corresponding to the second wireless charging category.

In yet other implementations, an apparatus for receiving wireless power is provided. The apparatus comprises means for transmitting a first indication of a first wireless charging category associated with the apparatus. The apparatus comprises means for receiving an indication of a wireless charging class of a power transmit unit (PTU). The apparatus comprises means for transmitting a second indication of a second wireless charging category associated with the apparatus based on the wireless charging class of the PTU being compatible with a higher wireless charging category than the first wireless charging category. The apparatus comprises means for receiving a level of wireless power corresponding to the second wireless charging category.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured, or coupled by a "receive coupler" to achieve power transfer.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
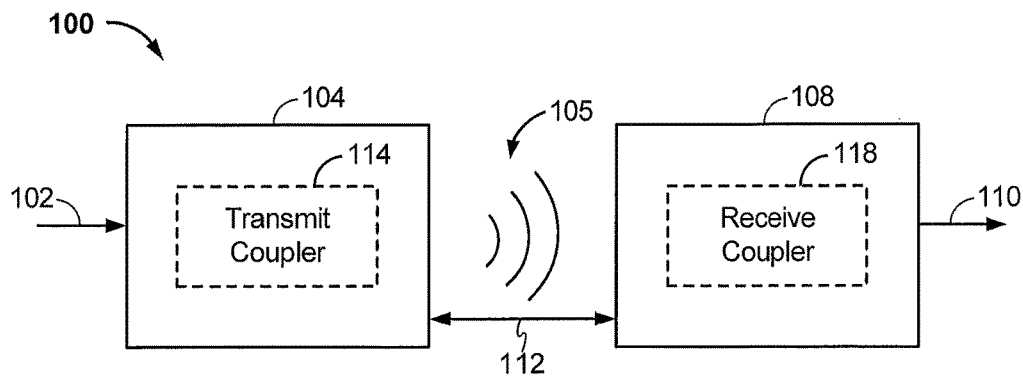
FIG. 1 is a functional block diagram of a wireless power transfer system, in accordance with some implementations.

FIG. 1 is a functional block diagram of a wireless power transfer system 100, in accordance with some exemplary implementations. Input power 102 may be provided to a transmitter 104 from a power source (not shown) to generate a wireless (e.g., magnetic or electromagnetic) field 105 via a transmit coupler 114 for performing energy transfer. The receiver 108 may receive power when the receiver 108 is located in the wireless field 105 produced by the transmitter 104. The wireless field 105 corresponds to a region where energy output by the transmitter 104 may be captured by the receiver 108. A receiver 108 may couple to the wireless field 105 and generate output power 110 for storing or consumption by a device (not shown in this figure) coupled to the output power 110. Both the transmitter 104 and the receiver 108 are separated by a distance 112.

In some implementations, power is transferred inductively via a time-varying magnetic field generated by the transmit coupler 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be reduced. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space. Resonant inductive coupling techniques may thus allow for improved efficiency and power transfer over various distances and with a variety of inductive coupler configurations.

In some implementations, the wireless field 105 corresponds to the "near-field" of the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114. Efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118.

Figure 2:
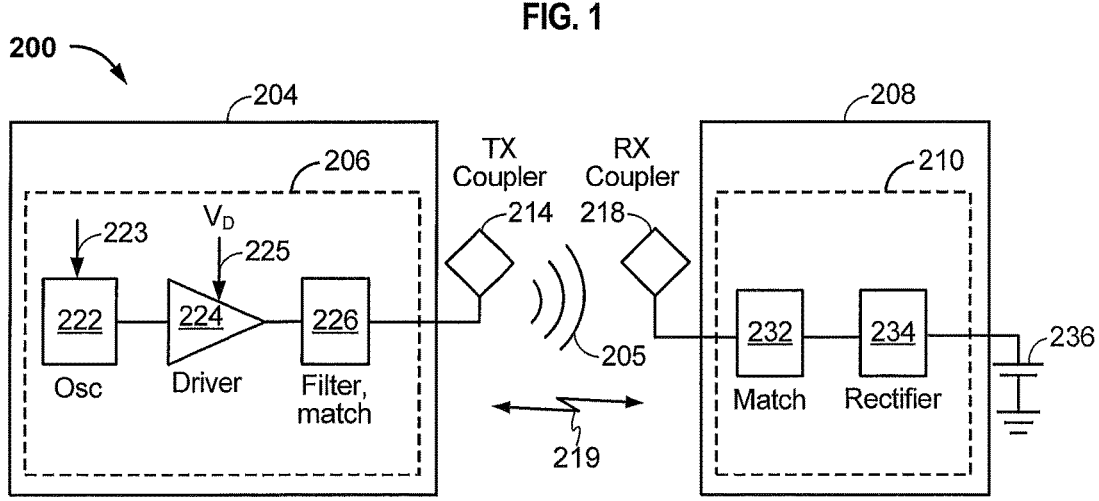
FIG. 2 is a functional block diagram of a wireless power transfer system, in accordance with some other implementations.

FIG. 2 is a functional block diagram of a wireless power transfer system 200, in accordance with some other exemplary implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that may be adjusted in response to a frequency control signal 223. The oscillator 222 provides the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 filters out harmonics or other unwanted frequencies and matches the impedance of the transmit circuitry 206 to the transmit coupler 214. As a result of driving the transmit coupler 214, the transmit coupler 214 generates a wireless field 205 to wirelessly output power at a level sufficient for charging a battery 236.

The receiver 208 comprises receive circuitry 210 that includes a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
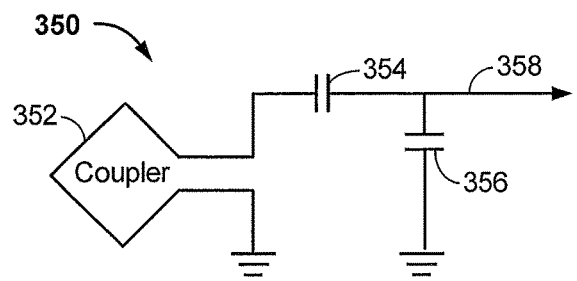
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some exemplary implementations. As illustrated in FIG. 3, transmit or receive circuitry 350 may include a coupler 352. The coupler 352 may also be referred to or be configured as a "conductor loop", a coil, an inductor, an antenna, or a "magnetic" coupler. The term "coupler"

generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added via a capacitor (or the self-capacitance of the coupler 352) to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. For larger sized couplers using large diameter couplers exhibiting larger inductance, the value of capacitance needed to produce resonance may be lower. Furthermore, as the size of the coupler increases, coupling efficiency may increase. This is mainly true if the size of both transmit and receive couplers increase. For transmit couplers, the signal 358, with a frequency that substantially corresponds to the resonant frequency of the coupler 352, may be an input to the coupler 352.

In some implementations, wireless power transmitters are configured to provide limited amounts of power based on a class of the transmitter in an effort to standardize compatibility between charging transmitters and receivers. Thus, a wireless power receiver may initially indicate its maximum power receiving capability to a wireless power transmitter in the form of a receiver category. However, if the power class of the wireless power transmitter indicates wireless power transfer capabilities less than this receiver capability, the transmitter may be determined incompatible with the wireless power receiver. Contrarily, if the wireless power receiver initially indicates a minimum required power receiving capability to the wireless transmitter, charging may proceed far slower than optimal when the wireless power transmitter has a higher power transfer capability (e.g., a greater amount of wireless power may be transferred) than the minimum required indication.

Figure 4:
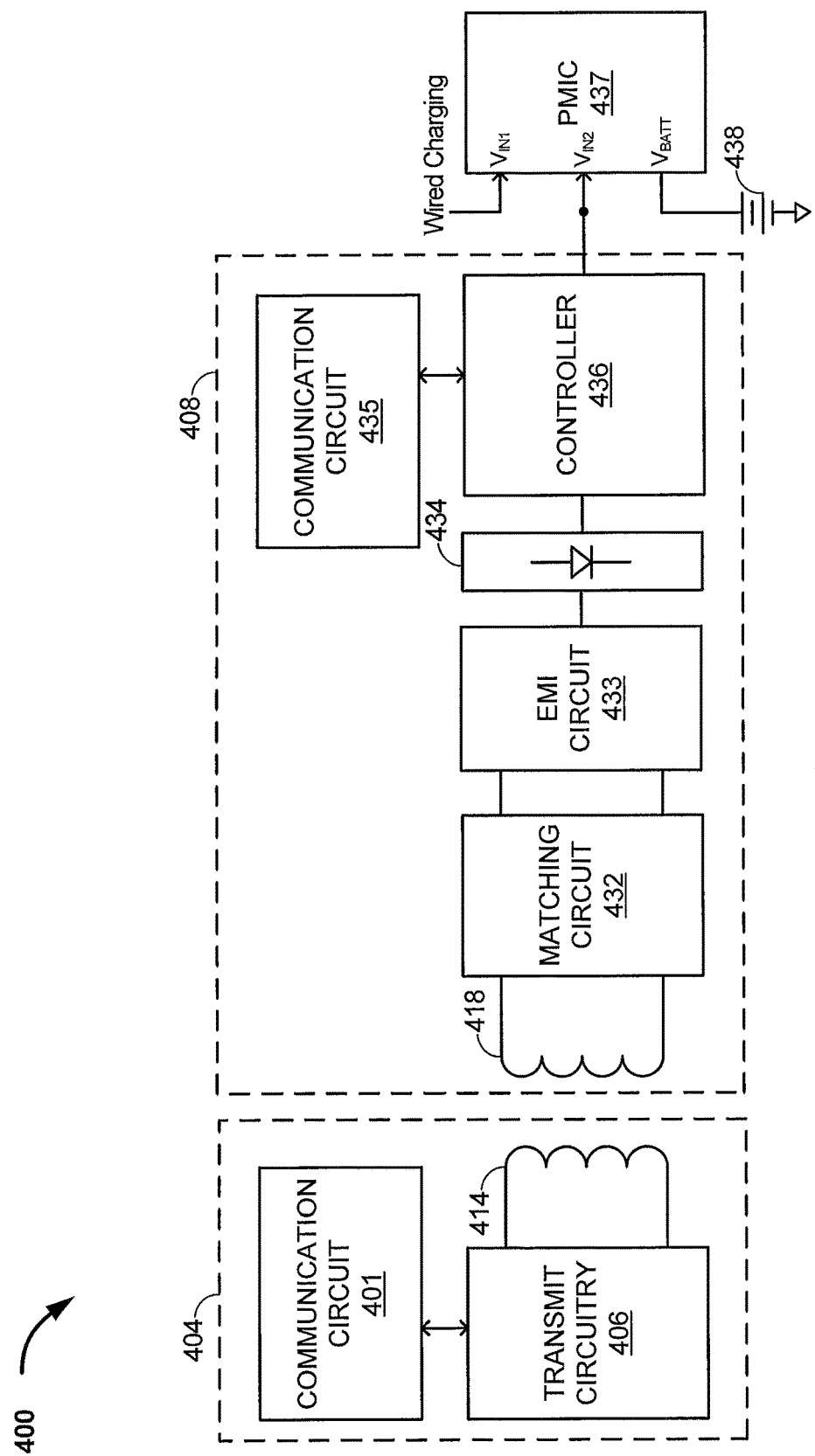
FIG. 4 is another functional block diagram of a wireless power transfer system, in accordance with some implementations.

FIG. 4 is another functional block diagram of a wireless power transfer system 400, in accordance with some implementations. FIG. 4 shows a power transmit unit (PTU) 404 and a power receive unit (PRU) 408. The PTU 404 may correspond to the transmitters 104, 204 as previously described in connection with FIGS. 1 and 2, respectively. Similarly, the PRU 408 may correspond to the receivers 108, 208 as previously described in connection with FIGS. 1 and 2, respectively. In some implementations, the PTU 404 may be compatible with a particular standard for wirelessly transferring power and the PRU 408 may be similarly compatible with the standard.

The PTU 404 may include transmit circuitry 406 configured to drive a transmit coupler 414 with an alternating current to generate an alternating wireless field (e.g., a magnetic field) for wirelessly transferring power to the PRU 408. In some implementations, the coupler 414 may also be referred to as, or comprise at least a portion of "means for transmitting a level of wireless power corresponding to the second wireless charging category," "means for transmitting the level of wireless power corresponding to the second wireless charging category," and/or "means for transitioning from transmitting a level of wireless power corresponding to the first wireless charging category to transmitting the level of wireless power corresponding to the second wireless charging category in a plurality of incremental steps."

The PTU 404 further includes a communication circuit 401, which may be a Bluetooth low energy (BLE) communication circuit configured to communicate in accordance with the BLE communications standard. However, the present application is not so limited and any other communications standard may be utilized by the communication circuit 401. The communication circuit 401 may also be referred to as, or comprise at least a portion of "means for receiving a first indication of a first wireless charging category associated with a power receiver unit (PRU)," "means for transmitting an indication of a wireless charging class," "means for receiving a second indication of a second wireless charging category associated with the PRU," "means for establishing a first wireless communication connection," and/or "means for transmitting an identifier."

To differentiate between different capabilities of different PTUs operating according to the standard, charging classes of PTUs may be defined based on an amount of power that the PTU 404 is configured to transmit. Examples of possible charging classes for PTUs are shown in Table 2 below. The PTU classes may further be based on desired compatibility with a particular PRU having certain capabilities. PRUs with different capabilities may be differentiated by defined categories of PRUs. Examples of such categories of PRUs are shown in Table 1 below, and/or by limitations of the components of the PTU 404.

TABLE 1

| PRU Category | Max Output Power of PRU Coupler | Example Application |
|---|---|---|
| Category 1 | 1.75 W | Bluetooth Headset |
| Category 2 | 3.5 W | Feature Phone |
| Category 3 | 6.5 W | Smart Phone |
| Category 4 | 13 W | Tablet |
| Category 5 | 25 W | Small Form Factor Laptop |
| Category 6 | 37.5 W | Regular Laptop |
| Category 7 | 50 W | — |

TABLE 2

| PTU Class | Max Input Power | Min. Category Support Requirements | Min. Value for Max. Number of Devices Supported |
|---|---|---|---|
| Class 1 | 2 W | 1 × Category 1 | 1 × Category 1 |
| Class 2 | 10 W | 1 × Category 3 | 2 × Category 2 |
| Class 3 | 16 W | 1 × Category 4 | 2 × Category 3 |
| Class 4 | 33 W | 1 × Category 5 | 3 × Category 3 |
| Class 5 | 50 W | 1 × Category 6 | 4 × Category 3 |
| Class 7 | 70 W | 1 × Category 7 | 5 × Category 3 |

The PRU 408 may include a receive coupler 418 configured to generate an alternating current under the influence of the wireless field (e.g., a magnetic field) generated by the transmit coupler 414. The receive coupler 418 may also be referred to as "means for receiving a level of wireless power corresponding to the second wireless charging category." The receive coupler 418 may be connected to a matching circuit 432, which matches an impedance of the receive coupler 418 to the impedance of the remainder of the receive chain in order to maximize the amount of wirelessly received power available for powering or charging the PRU 408 and/or an attached device. The matching circuit 432 is electrically connected to an electromagnetic interference (EMI) filtering circuit 433, which is configured to remove any frequency content of the alternating current output by the matching circuit 432 that may cause EMI in excess of any applicable regulatory limits. The EMI filtering circuit 433 is electrically connected to a rectification circuit 434, which is configured to rectify the alternating current and outputs a direct current. The rectification circuit 434 is operably connected to a controller 436. The controller 436 may be configured to perform one or more measurements regarding the wirelessly received power, to control a communications circuit 435, and/or to selectively output power to a power management integrated circuit (PMIC) 437. The controller 436 may also be referred to as "means for establishing a first wireless communication connection with the PTU," "means for abolishing the first wireless communication connection," and/or "means for transitioning from receiving a level of wireless power corresponding to the first wireless charging category to receiving the level of wireless power corresponding to the second wireless charging category in a plurality of incremental steps."

The communications circuit 435 is configured to communicate with the communication circuit 401 of the PTU 404 for setting up a communication channel between the PTU 404 and the PRU 408 and for negotiating and/or optimizing charging conditions between the PTU 404 and the PRU 408, as will be described in connection with FIGS. 5-9 below. The communication circuit 435 may also be referred to as "means for transmitting a first indication of a first wireless charging category associated with the apparatus," "means for receiving an indication of a wireless charging class of a power transmit unit (PTU)," "means for transmitting a second indication of a second wireless charging category associated with the apparatus," and/or "means for receiving an identifier of the PTU." The PMIC 437 may be configured to receive power from the PRU 408 (e.g., at a $V_{IN2}$ pin) and/or from a wired charging power connection (e.g., at a $V_{IN1}$ pin) and output power to a battery 438 (e.g., via a $V_{BATT}$ pin).

In some implementations, the PRU 408 may advertise itself, via the communication circuit 435, as a PRU having a variable wireless charging category based on the class of PTU the PRU is charged by and/or paired with. In general, the PRU 408 will advertise itself as being associated with the lowest wireless charging category that is practical for charging (e.g., the lowest PRU wireless charging category that would provide enough power to minimally power the PRU 408). This may or may not be the lowest possible wireless charging category. The PRU 408 may then disconnect itself from the PTU 404 once the PRU 408 determines that the PTU 404 can support charging compatible with the higher wireless charging category.

Such a solution allows improved compatibility between the PTU 404 and the PRU 408 while simultaneously allowing for faster rates of charging for compatible devices. For example, a category "3" might limit the power at the output of the receiver resonator to 6.5 watts (see Table 1). However, many smartphones today are capable of accepting higher power levels at their charger inputs. For example, many PMICs that handle battery charging are capable of accepting up to 10 W or higher. In such scenarios, the battery charging time with wireless charging (6.5 W limitations) is much longer than it is with wired charging (10 W limitations).

For example, where the battery 438 is a 3000 mAH battery charging to 4.2V, complete charging from total discharge takes 1.26 hours with a wired charger, assuming 10 W of power delivered to the $V_{IN1}$ port of the PMIC 437 and neglecting any other losses (e.g., 3000 mAH×4.2V/10 W=1.26 hours). However, the same charge cycle will take more than 2 hours for wireless charging on any class PTU 404 if the device is certified as a category 3 device (see Table 1), since the category 3 device is not allowed to receive more than 6.5 W (and therefore the PTU 404 would not supply power at higher levels), which may result in only approximately 5.5 W reaching the battery 438 (e.g., 3000 mAH× 4.2V/5.5 W=2.29 hours). This can cause poor, inaccurate user perception of the capabilities of wireless charging.

Figure 5:
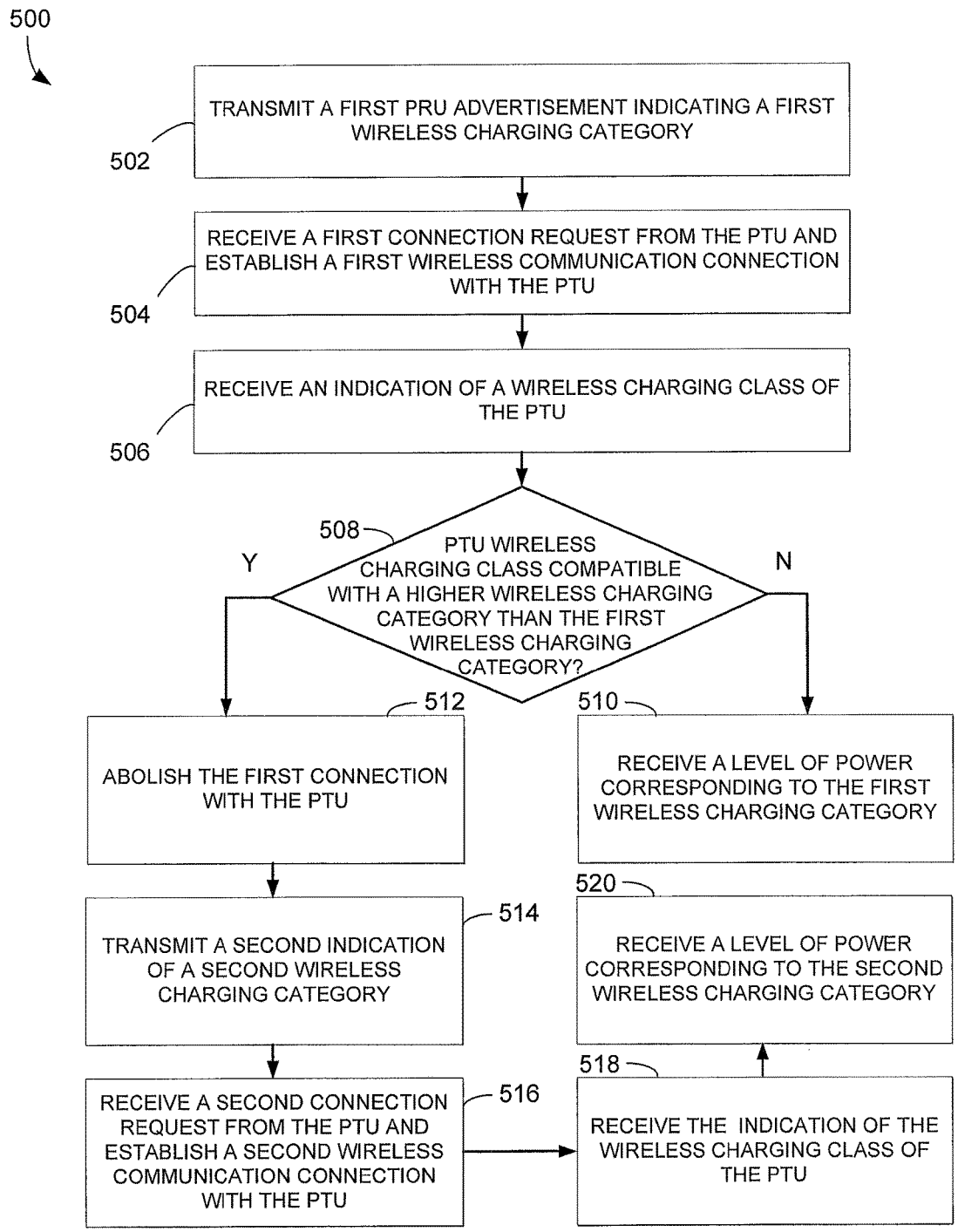
FIG. 5 is a flowchart depicting a method for wireless power transfer by a PRU, in accordance with some implementations.

FIG. 5 is a flowchart 500 depicting a method for wireless power transfer by a PRU 408, in accordance with some implementations. The method depicted by FIG. 5 may correspond to an exemplary method carried out by the PRU 408 of FIG. 4. Although blocks may be described as occurring in a certain order, the blocks can be reordered, blocks can be omitted, and/or additional blocks can be added.

The flowchart 500 may begin with block 502, which may include transmitting a first indication of a first wireless charging category. For example, the PRU 408 of FIG. 4 may be configured to transmit a first PRU advertisement to the PTU 404 indicating a lowest wireless charging category compatible with an actual, higher wireless charging category of the PRU 408. For example, if the PRU 408 has an actual wireless charging category of Category 4 (see Table 1), the PRU 408 may transmit a first PRU advertisement indicating a wireless charging category of Category 1, 2, or 3. Thus, the first wireless charging category is associated with an amount of wireless power less than a maximum amount of wireless power the apparatus is configured to receive. Related to block 502, the communication circuit 401 of the PTU 404 may be configured to receive the first indication of the first wireless charging category associated with the PRU 408. The flowchart 500 may then proceed to block 504.

Block 504 may include receiving a first wireless communication connection request from the PTU 404 and establishing a first wireless communication connection with the PTU 404. For example, the PTU 404 may establish a first wireless communication connection with the PRU 408 via the communication circuits 401 and 435, respectively. This connection may constitute a formal establishment of a communication channel between the PTU 404 and the PRU 408 and, in some implementations, may comprise a back and forth negotiation between the PTU 404 and the PRU 408. The flowchart 500 may then proceed to block 506.

Block 506 may include receiving an indication of a wireless charging class of the PTU. For example, the PRU 408 may receive an indication of a Class 3 PTU from the PTU 404. Thus, the communication circuit 401 of the PTU 404 is configured to transmit the indication of the wireless charging class of the PTU 404. The flowchart 500 may then proceed to block 508.

Block 508 may include determining whether the PTU wireless charging class is compatible with a higher, wireless category than the first wireless charging category. In some implementations, the controller 436 of the PRU 408 may make such a determination. In some implementations, if the PTU 404 is a Class 3 PTU and the PRU has an actual wireless charging category of Category 4 (or at least may determine that it can receive power at levels associated with a Class 3 PTU 404) but the PRU 408 previously sent the first PRU advertisement indicating a Category 1 PRU, the controller 436 may determine that the PTU Class 3 is compatible with a higher wireless charging category than the previously advertised Category 1 (e.g., Category 2, 3, or 4). If the determination at block 508 is NO, the flowchart may proceed to block 510, where the PRU 408 may begin charging at a power level corresponding to the first wireless charging category (e.g., Category 1 in this example). Alternatively, if the determination is YES, the flowchart may proceed to block 512.

Block 512 may include abolishing the first wireless communication connection with the PTU. For example, the PRU 408 may break down the first wireless communication connection with the PTU 404 previously described in connection with block 504. The flowchart 500 may then advance to block 514. In some implementations, the PRU 408 may not actually break down the first wireless communication connection with the PTU 404. In such implementations, the flowchart 500 may advance directly from block 508 to block 514.

Block 514 may include transmitting a second indication of a second wireless charging category. For example, the PRU 408 may transmit a second PRU advertisement indicating a higher wireless charging category than was indicated by the first PRU advertisement of block 502 that is still compatible with the actual wireless charging category of the PRU 408 (e.g., any of a Category 2, 3 or 4 PRU) based on the wireless charging class of the PTU 404 being compatible with a higher wireless charging category than the first wireless charging category. Thus, the higher wireless charging category indicates an ability to receive a greater amount of wireless power than is associated with the first wireless charging category. Accordingly, the communication circuit 401 of the PTU 404 may be configured to receive the second indication of the second wireless charging category associated with the PRU 408 based on the wireless charging class of the PTU 404 being compatible with a higher wireless charging category of the PRU 408 than the first wireless charging category. The flowchart 500 may then advance to block 516.

Block 516 may include receiving a second wireless communication connection request from the PTU and establishing a second wireless communication connection with the PTU. For example, the PRU 408 may receive a second wireless communication connection request from the PTU 404 and may subsequently establish a second wireless communication connection with the PTU 404. The flowchart 500 may then advance to block 518. In some implementations, where the first wireless communication connection was not abolished (e.g., where block 512 is not present), flowchart 500 may not include block 516 and instead, the flowchart 500 may advance directly from block 514 to block 518 or, alternatively, directly from block 514 to block 520.

Block 518 may include receiving the indication of the wireless charging class of the PTU. For example, once the second wireless communication connection is established with the PTU 404, the PRU 408 may receive the same indication at block 518 that it received at block 506. This may also happen when the PTU 404 is pre-configured to transmit its wireless charging class to the PRU upon establishment of a wireless communication connection. The flowchart 500 may then advance to block 520. As stated above, where the first wireless communication connection was not abolished (e.g., where block 512 is not present), the flowchart may not include block 518 and instead, the flowchart 500 may advance directly from block 514 to block 520.

Block 520 may include receiving a level of wireless power corresponding to the second wireless charging category. For example, where the PRU 408 has previously sent the second PRU advertisement indicating any of the Category 2, 3 or 4 PRU at block 514, the PRU 408 may now begin receiving charging power at a power level corresponding to that newly indicated wireless charging category (see Table 1). Likewise, the coupler 414 of the PTU 404 may be configured to transmit the level of power corresponding to the second wireless charging category.

Figure 6:
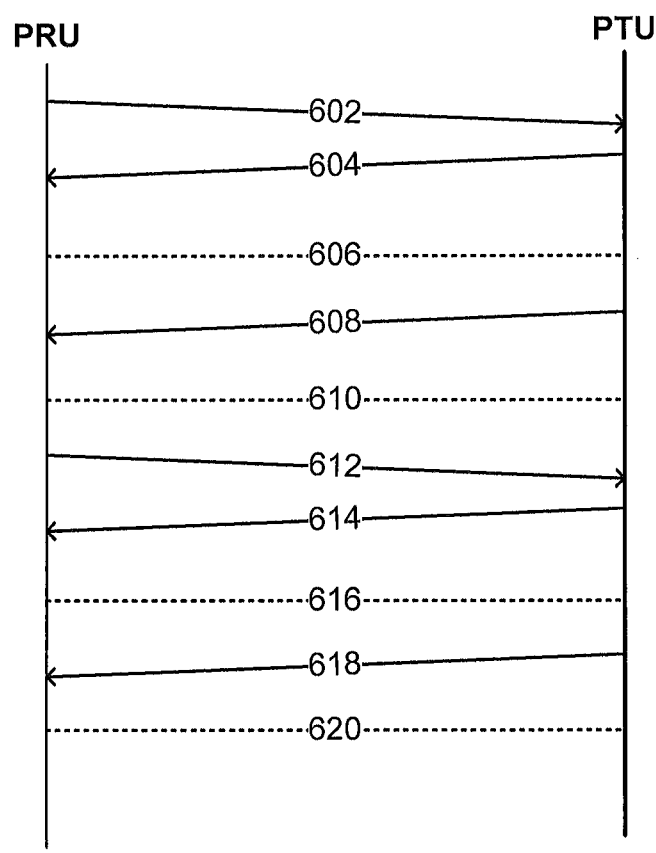
FIG. 6 is a call flow diagram of signals exchanged between a power transmit unit and a power receive unit in wireless charging, in accordance with some implementations.

FIG. 6 is a call flow diagram 600 of signals exchanged between a power transmit unit and a power receive unit in wireless charging, in accordance with some implementations. The call flow diagram 600 may parallel the flowchart 500 of FIG. 5.

The call flow diagram 600 includes a message 602 transmitted by the PRU 408 and received by the PTU 404, which includes an advertisement indicating a first wireless charging category. The message 602 may correspond to block 502 of FIG. 5.

The call flow diagram 600 further includes a message 604 transmitted by the PTU 404 and received by the PRU 408, which includes a first wireless communication connection request from the PTU 404. Dotted line 606 indicates the establishment of a first wireless communication session or channel between the PTU 404 and the PRU 408 and may include several messages back and forth between the PTU 404 and the PRU 408. The message 604 may correspond to block 504 of FIG. 5.

The call flow diagram 600 further includes a message 608 transmitted by the PTU 404 and received by the PRU 408 including an indication of a wireless charging class of the PTU 404. The message 608 may correspond to block 506 of FIG. 5.

The call flow diagram 600 may further include dotted line 610, which indicates abolishing the first wireless communication connection indicated by dotted line 606 in response to the PRU 408 determining that the PTU wireless charging class is compatible with a higher wireless charging category than the first wireless charging category. In some implementations as described above in connection with FIG. 5, the PRU 408 may not abolish the first wireless communication connection. In such implementations, the call flow diagram may not include the dotted line 610.

The call flow diagram 600 further includes a message 612 transmitted by the PRU 408 and received by the PTU 404 indicating a second PRU advertisement indicating a second wireless charging category. The message 612 may correspond to block 514 of FIG. 5.

The call flow diagram 600 may further include a message 614 transmitted by the PTU 404 and received by the PRU 408 indicating a second wireless communication connection request from the PTU 404. Establishment of the second wireless communication connection between the PRU 408 and the PTU 404 is indicated by the dotted line 616. In some implementations where the first wireless communication connection is not abolished (e.g., where the call flow diagram 600 does not include dotted line 610), the call flow diagram 600 also may not include message 614, since the first wireless communication connection would remain established.

The call flow diagram 600 further includes a message 618 transmitted by the PTU 404 and received by the PRU 408 indicating the wireless charging class of the PTU 404. This sixth message 618 may include the same information that was previously included in the third message 608. The message 618 may correspond to block 518 of FIG. 5. In some implementations where the first wireless communication connection is not abolished (e.g., where the call flow diagram 600 does not include the dotted line 610), the call flow diagram 600 also may not include message 618, since the information was previously included in the third message 608 associated with establishment of the first wireless communication connection.

After the sixth message 618, charging at a power level corresponding to the second wireless charging category may begin, as previously described in connection with block 520 of FIG. 5. The second wireless communication connection established with respect to block 518 of FIG. 5 and by the dotted line 616 can be dropped by either the PTU 404 or the PRU 408 at any time, as indicated by the dotted line 620.

Figure 7:
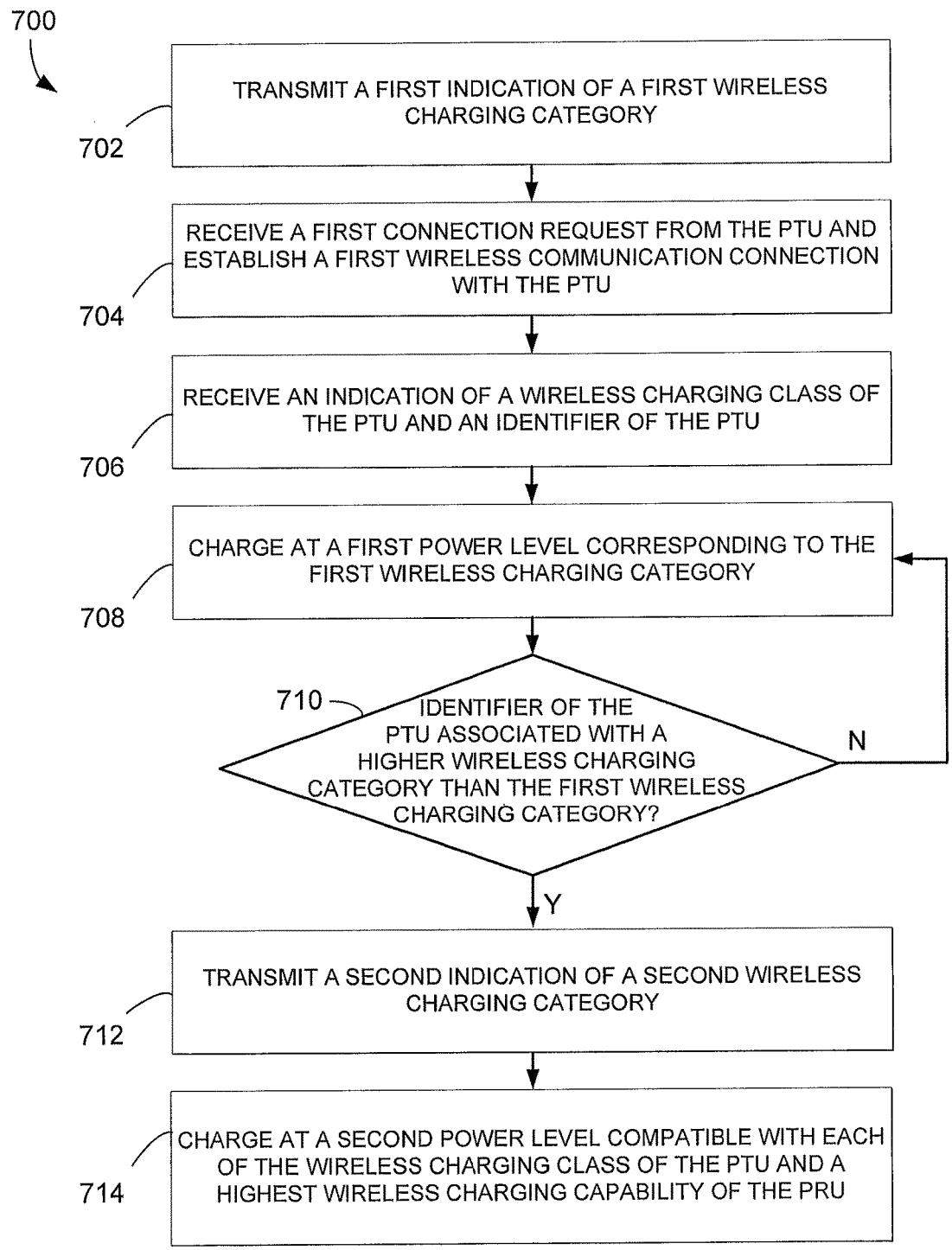
FIG. 7 is another flowchart depicting a method for wireless power transfer by a PRU, in accordance with some implementations.

FIG. 7 is another flowchart 700 depicting a method for wireless power transfer by a PRU, in accordance with some implementations. In some cases, a manufacturer who designs a specific PTU/PRU combination will know that particular combination can draw more power than would be indicated by the category or class ratings. In such cases, the PRU may identify the PTU as a specific high-power-capable PTU based on an identifier received from the PTU and increase its power draw for that charging session only. The flowchart 700 depicted by FIG. 7 may correspond to another exemplary method carried out by the PRU 408 of FIG. 4. Although blocks may be described as occurring in a certain order, the blocks can be reordered, blocks can be omitted, and/or additional blocks can be added.

The flowchart 700 may begin with block 702, which may include transmitting a first indication of a first wireless charging category. For example, the PRU 408 of FIG. 4 may be configured to transmit a first PRU advertisement to the PTU 404 indicating a lowest wireless charging category compatible with an actual, higher wireless charging category of the PRU 408. For example, if the PRU 408 has an actual wireless charging category of Category 4 (see Table 1), the PRU 408 may transmit a first PRU advertisement indicating a wireless charging category of Category 1, 2, or 3. The flowchart 700 may then proceed to block 704.

Block 704 may include receiving a first wireless communication connection request from the PTU 404 and establishing a first wireless communication connection with the PTU 404. For example, the PTU 404 may establish a first wireless communication connection with the PRU 408 via the communication circuits 401 and 435, respectively. This connection may constitute a formal establishment of a communication channel between the PTU 404 and the PRU 408. The flowchart 700 may then proceed to block 706.

Block 706 may include receiving an indication of a wireless charging class of the PTU 404 and an identifier of the PTU 404. For example, the PRU 408 may receive an indication of a Class 3 PTU from the PTU 404 and an identifier associated with the PTU 404. Likewise, the communication circuit 401 of the PTU 404 may be configured to transmit the identifier of the PTU 404. The flowchart 700 may then proceed to block 708.

Block 708 may include charging at a first power level corresponding to the first wireless charging category. For example, the PTU 404 may wirelessly transmit an amount of power corresponding to the wireless charging category of Category 1, 2, or 3 that the PRU 408 previously indicated in block 702. The flowchart 700 may then proceed to block 710.

Block 710 may include determining whether the identifier of the PTU is associated with a wireless charging category greater than the first wireless charging category. For example, if the identifier of the PTU 404 is associated with a wireless charging class configured to provide more power than the first wireless charging category indicates that the PRU 408 is configured to receive (e.g., the Category 1, 2 or 3 previously indicated by the PRU 408 in block 702) but within a range of power than the PRU 408 is actually capable of receiving, then the flowchart 700 may advance to block 712. If the determination is NO at block 710 then the flowchart 700 may advance back to block 708 and continue charging at the first power level corresponding to the first wireless charging category indicated by the PRU 408 in block 702.

Block 712 may include transmitting a second indication of a second wireless charging category. For example, the PRU 408 may transmit a second PRU advertisement indicating a higher wireless charging category than was indicated by the first PRU advertisement of block 702 that is still compatible with the actual wireless charging category of the PRU 408 (e.g., any of a Category 2, 3 or 4 PRU) based on the identifier of the PTU 404 being associated with a wireless charging category than the first wireless charging category. The flowchart 700 may advance to block 714.

Block 714 may include charging at a second power level compatible with each of the wireless charging category of the PTU 404 and a highest wireless charging capability of the PRU 408. For example, if the PRU 408 is actually capable of receiving as much as 10 W for charging or operating and the PTU 404 is a Class 3 PTU (see Table 2) capable of inputting a maximum of 16 W to the transmit coupler 414, the PTU 404 may transmit wireless power such that the PRU 408 receives as much as 10 W of power wirelessly. Transition to this second power level may be achieved in a single step (e.g., advancing from the first power level directly to the second power level) or in a plurality of steps separated over a relatively short amount of time (e.g., ramping up power transfer from the first power level to the second power level incrementally or continuously). Thus, the coupler 401 of the PTU 404 is configured to transmit the level of wireless power corresponding to the second wireless charging category based on the identifier of the PTU 404 being associated with a higher wireless charging category associated with the PRU 408 than the first wireless charging category. In such implementations, the coupler 401 of the PTU 404 is configured to transition from transmitting the level of wireless power corresponding to the first wireless charging category to transmitting the level of wireless power corresponding to the second wireless charging category in a plurality of incremental steps.

Figure 8:
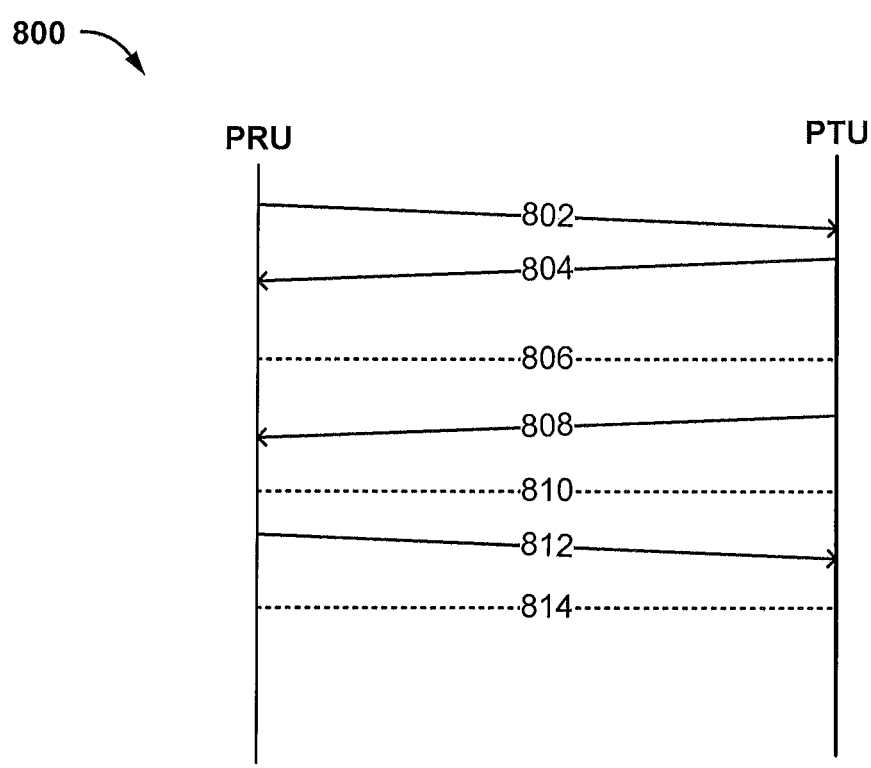
FIG. 8 is another call flow diagram of signals exchanged between a power transmit unit and a power receive unit in wireless charging, in accordance with some implementations.

FIG. 8 is another call flow diagram of signals exchanged between a power transmit unit and a power receive unit in wireless charging, in accordance with some implementations. The call flow diagram 800 may parallel the flowchart 700 of FIG. 7.

The call flow diagram 800 includes a message 802 transmitted by the PRU 408 and received by the PTU 404, which includes an advertisement indicating a first wireless charging category, similar to that previously described in connection with block 702 of flowchart 700 (see FIG. 7).

The call flow diagram 800 further includes a message 804 transmitted by the PTU 404 and received by the PRU 408, which includes a first wireless communication connection request from the PTU 404. Dotted line 806 indicates the establishment of a first wireless communication session or channel between the PTU 404 and the PRU 408. The message 804 may correspond to block 704 of FIG. 7.

The call flow diagram 800 further includes a message 808 transmitted by the PTU 404 and received by the PRU 408 including an indication of a wireless charging class of the PTU 404 and an identifier of the PTU 404. The message 808 may correspond to block 706 of FIG. 7.

The call flow diagram 800 further includes dotted line 810, which indicates wireless charging of the PRU 408 by the PTU 404 at a first power level corresponding to the first wireless charging category. The dotted line 810 may correspond to block 708 of FIG. 7.

The call flow diagram 800 further includes a message 812 transmitted by the PRU 408 and received by the PTU 404, which includes an advertisement indicating a higher wireless charging category than the first wireless charging category indicated in message 802. The message 812 may correspond to block 712 of FIG. 7.

The call flow diagram 800 further includes dotted line 814, which indicates wireless charging of the PRU 408 by the PTU 404 at a second power level compatible with each of the wireless charging category of the PTU 404 and a highest wireless charging capability of the PRU 408. The dotted line 814 may correspond to block 714 of FIG. 7.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for receiving wireless power, comprising:
   a communication circuit configured to:
      transmit a first indication of a first wireless charging category associated with the apparatus,
      receive an indication of a wireless charging class of a power transmit unit (PTU),
      compare a power associated with the first wireless charging category to another power associated with the wireless charging class of the PTU,
      determine if the wireless charging class of the PTU is compatible with a higher wireless charging category than the first wireless charging category based on the comparison, and
      transmit a second indication of a second wireless charging category associated with the apparatus based on the determination; and
   a coupler configured to receive a level of wireless power corresponding to the second wireless charging category.

2. The apparatus of claim 1, wherein the first wireless charging category is associated with an amount of wireless power less than a maximum amount of wireless power the apparatus is configured to receive.

3. The apparatus of claim 1, wherein the higher wireless charging category indicates an ability to receive a greater amount of wireless power than is associated with the first wireless charging category.

4. The apparatus of claim 1, further comprising a processor configured to establish a first wireless communication connection with the PTU via the communication circuit in response to the communication circuit receiving a first wireless communication connection request from the PTU.

5. The apparatus of claim 4, wherein the processor is configured to abolish the first wireless communication connection based on the wireless charging class of the PTU being compatible with the higher wireless charging category than the first wireless charging category.

6. The apparatus of claim 1, wherein the communication circuit is further configured to receive an identifier of the PTU, and the coupler is configured to receive the level of wireless power corresponding to the second wireless charging category based on the identifier of the PTU being associated with a higher wireless charging category than the first wireless charging category.

7. The apparatus of claim 6, wherein the coupler is configured to transition from receiving a level of wireless power corresponding to the first wireless charging category to receiving the level of wireless power corresponding to the second wireless charging category in a plurality of incremental steps.

8. A method for receiving wireless power, comprising:
transmitting a first indication of a first wireless charging category associated with an apparatus;
receiving an indication of a wireless charging class of a power transmit unit (PTU);
comparing a power associated with the first wireless charging category to another power associated with the wireless charging class of the PTU;
determining if the wireless charging class of the PTU is compatible with a higher wireless charging category than the first wireless charging category based on the comparing;
transmitting a second indication of a second wireless charging category associated with the apparatus based on the determining; and
receiving a level of wireless power corresponding to the second wireless charging category.

9. The method of claim 8, wherein the first wireless charging category is associated with an amount of wireless power less than a maximum amount of wireless power the apparatus is configured to receive.

10. The method of claim 8, wherein the higher wireless charging category indicates an ability to receive a greater amount of wireless power than is associated with the first wireless charging category.

11. The method of claim 8, further comprising establishing a first wireless communication connection with the PTU in response to receiving a first wireless communication connection request from the PTU.

12. The method of claim 11, further comprising abolishing the first wireless communication connection based on the wireless charging class of the PTU being compatible with the higher wireless charging category than the first wireless charging category.

13. The method of claim 8, further comprising receiving an identifier of the PTU, wherein receiving the level of wireless power corresponding to the second wireless charging category is based on the identifier of the PTU being associated with a higher wireless charging category than the first wireless charging category.

14. The method of claim 13, further comprising transitioning from receiving a level of wireless power corresponding to the first wireless charging category to receiving the level of wireless power corresponding to the second wireless charging category in a plurality of incremental steps.

15. At least one non-transitory, computer-readable medium comprising code that, when executed, causes an apparatus for receiving wireless power to:
transmit a first indication of a first wireless charging category associated with the apparatus;
receive an indication of a wireless charging class of a power transmit unit (PTU);
compare a power associated with the first wireless charging category to another power associated with the wireless charging class of the PTU;
determine if the wireless charging class of the PTU is compatible with a higher wireless charging category than the first wireless charging category based on the comparison;
transmit a second indication of a second wireless charging category associated with the apparatus based on the determination; and
receive a level of wireless power corresponding to the second wireless charging category.

16. The at least one medium of claim 15, wherein the first wireless charging category is associated with an amount of wireless power less than a maximum amount of wireless power the apparatus is configured to receive.

17. The at least one medium of claim 15, wherein the code, when executed, further causes the apparatus to:
establish a first wireless communication connection with the PTU in response to receiving a first wireless communication connection request from the PTU; and
abolish the first wireless communication connection based on the wireless charging class of the PTU being compatible with the higher wireless charging category than the first wireless charging category.

18. The at least one medium of claim 15, wherein the code, when executed, further causes the apparatus to receive an identifier of the PTU, wherein receiving the level of wireless power corresponding to the second wireless charging category is based on the identifier of the PTU being associated with a higher wireless charging category than the first wireless charging category.

19. The at least one medium of claim 18, wherein the code, when executed, further causes the apparatus to transition from receiving a level of wireless power corresponding to the first wireless charging category to receiving the level of wireless power corresponding to the second wireless charging category in a plurality of incremental steps.

20. An apparatus for receiving wireless power, comprising:
means for transmitting a first indication of a first wireless charging category associated with the apparatus;
means for receiving an indication of a wireless charging class of a power transmit unit (PTU);
means for comparing a power associated with the first wireless charging category to another power associated with the wireless charging class of the PTU;
means for determining if the wireless charging class of the PTU is compatible with a higher wireless charging category than the first wireless charging category responsive to operation of the means for comparing;
means for transmitting a second indication of a second wireless charging category associated with the apparatus responsive to operation of the means for determining; and
means for receiving a level of wireless power corresponding to the second wireless charging category.

21. The apparatus of claim 20, further comprising:
means for establishing a first wireless communication connection with the PTU in response to the means for receiving the indication of the wireless charging class of the PTU receiving a first wireless communication connection request from the PTU; and
means for abolishing the first wireless communication connection based on the wireless charging class of the PTU being compatible with the higher wireless charging category than the first wireless charging category.

22. The apparatus of claim 20, further comprising:
means for receiving an identifier of the PTU, wherein the means for receiving the level of wireless power corresponding to the second wireless charging category is configured to receive the level of wireless power corresponding to the second wireless charging category based on the identifier of the PTU being associated with a higher wireless charging category than the first wireless charging category; and means for transitioning from receiving a level of wireless power corresponding to the first wireless charging category to receiving the level of wireless power corresponding to the second wireless charging category in a plurality of incremental steps.

23. The apparatus of claim 1, wherein the communication circuit is further configured to:

transmit the second indication of the second wireless charging category associated with the apparatus prior to the coupler receiving a level of wireless power corresponding to the first wireless charging category.

24. The apparatus of claim 1, wherein the power associated with the first wireless charging category and the other power associated with the wireless charging class of the PTU are stored in a memory of the apparatus.

25. The apparatus of claim 24, wherein the power associated with the first wireless charging category and the other power associated with the wireless charging class of the PTU are stored in the memory with at least one table including one or more power values of respective charging categories and charging classes.

26. The apparatus of claim 24, wherein the power associated with the first wireless charging category and the other power associated with the wireless charging class of the PTU are stored in the memory with at least one table including a ranked listing of charging categories and charging classes.

27. The apparatus of claim 1, wherein the communication circuit is further configured to:

receive an identifier of the PTU; and transmit the second indication of the second wireless charging category associated with the apparatus based on the identifier of the PTU.

28. The apparatus of claim 27, wherein the communication circuit is further configured to:

determine if the identifier of the PTU is associated with a higher wireless charging category than the first wireless charging category based on the identifier of the PTU; and transmit the second indication of the second wireless charging category associated with the apparatus based on the determination that includes the identifier of the PTU.

* * * * *